4594X
D. G. Dunham,
Washing Machine,
Patented Dec. 7, 1826.
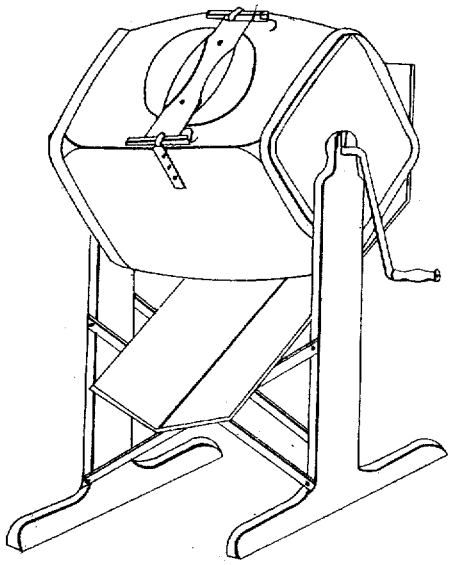
Witnesses:
Daniel Fenlines.
Lewis H Hoagland
Inventor:
D. G. Dunham

BEST AVAILABLE COPY

4594 X
12-1-1826

[illegible] [illegible] [illegible] [illegible] there are [illegible] [illegible].
[illegible] [illegible] [illegible] there is a [illegible] [illegible] on the sides of
[illegible] [illegible] [illegible] [illegible] sides near the crank end of the box,
which can be [illegible] out, when the door is uppermost, to let
the [illegible] escape, which would otherwise force its way through
[illegible] [illegible] [illegible] the door, this is done after one or two revo-
lutions of the Machine, which need not be repeated. this is
[illegible] [illegible] each time the Door is opened and shut. the revolv[illegible]
[illegible] [illegible], with the motion of the balls, forces the air out at
[illegible] the box is grooved at each end and let in similar to a
[illegible] [illegible] [illegible] together with nails, and filed at the ends
[illegible] [illegible] [illegible] the corners shaved rounding to drive the hoops
on. after which there is four strips, chamfered down at each
[illegible] the [illegible] [illegible] [illegible] by driving a wedge under each to
raise them [illegible] the [illegible], which causes the hoops to draw
on the sides, as also the corners of the Machine.
[illegible] [illegible] hole is made at the angle which will be at the
[illegible] when the door is uppermost, by which to draw
the water or suds as desired. in using this simple Machine
you need pay no attention to the position of the balls, if the
Machine stands level. the Machine will by the revolving motion
regulate the position, both of the balls and Clothes.

The Same principle may also be applyed for Churning
[illegible] without the use of balls

[illegible] Dunham

[illegible]: David G. [illegible]
[illegible] in [illegible]
[illegible] in [illegible]